(Model.)
C. A. HIGBEE.
BOLT AND NUT.
No. 501,941. Patented July 25, 1893.
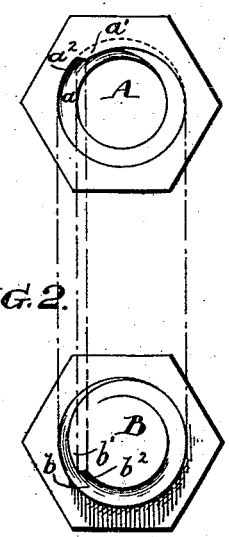
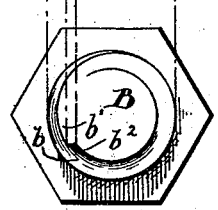
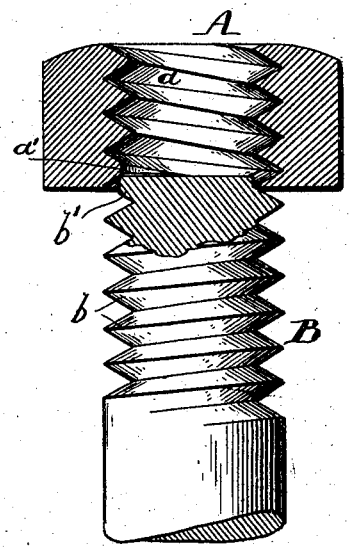
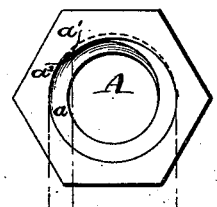
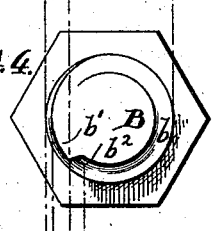
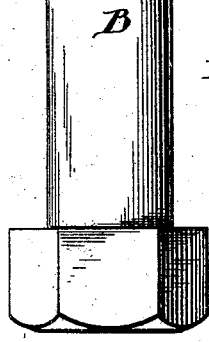
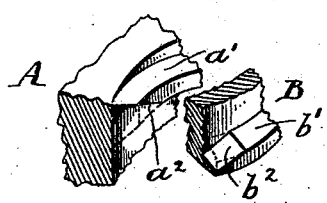
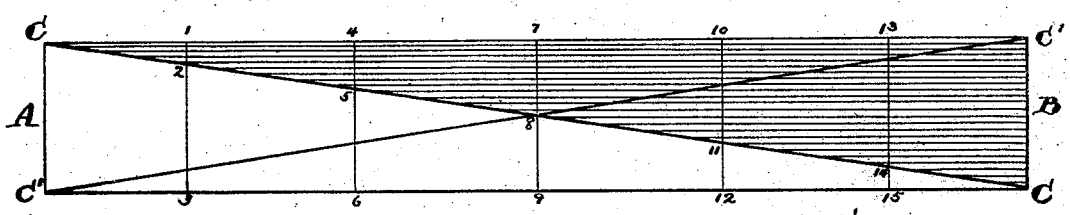
Witnesses:
Inventor:
Clinton A. Higbee
by his atty

UNITED STATES PATENT OFFICE.

CLINTON A. HIGBEE, OF PHILADELPHIA, PENNSYLVANIA.

BOLT AND NUT.

SPECIFICATION forming part of Letters Patent No. 501,941, dated July 25, 1893.

Application filed March 2, 1892. Serial No. 423,451. (Model.)

*To all whom it may concern:*

Be it known that I, CLINTON A. HIGBEE, of the city and county of Philadelphia, State of Pennsylvania, have invented a certain new and useful Improvement in Nuts and Bolts, of which the following is a true and exact description, reference being had to the accompanying drawings, which form a part of this specification.

My invention relates to the construction of nuts and bolts, and has for its object to so improve their construction as to avoid the risk of jamming and crushing the threads. In my former patent, No. 447,775, of March 10, 1891, I have shown and described an improvement having the same object in view, and in which the threads are cut off so as to have their ends of a substantially symmetrical section on each side of the center line.

My present invention relates to threads which taper toward the ends as is usually the case, and has for its object to secure at the same time the loose fit on entering the bolt in the nut and to avoid the danger of jamming incident to such nuts and bolts as heretofore constructed. This I accomplish by so cutting the ends of the tapered threads that at their extreme ends their aggregate height will equal or exceed the total height of a single thread. By so forming the threads I effectually prevent them from lapping on each other, and insure that each shall enter its corresponding groove in correct position.

Reference being now had to the drawings in which my invention is illustrated, Figure 1 is an end view of a nut, and Fig. 2 an end view of a bolt constructed in accordance with my invention. Figs. 3 and 4 show ends of a nut and bolt of a modified construction, but still embodying my invention. Fig. 5 is an elevation of the bolt Fig. 4. Fig. 6 shows the nut and bolt together illustrating how the described construction prevents jamming or false engagement. Fig. 7 shows the beveling of the ends which I prefer to employ, and Fig. 8 is a diagram illustrating the principle of construction.

A is the nut, $a$ the full sized thread, $a'$ the tapered section of the thread end, and $a^2$ the butt end of the thread in the nut; B is the bolt, $b$ its full sized thread, $b'$ the tapered end and $b^2$ the butt or extreme end of the bolt thread.

The essential feature of my new construction is that the height of the tapered thread sections $a'$ $b'$ at their ends $a^2$ $b^2$ should in the aggregate equal the height of the thread $a$ or $b$. Thus referring to diagram Fig. 8, the distance C C' we will take to be the height of a thread, and the diagonal lines C C or C' C' to represent the taper of the end $a'$ or $b'$. The cross lines at 1, 4, 7, &c., will represent points where the tapered threads are terminated. Then it will be seen that if the bolt thread is at its end as high as indicated at 1—2 the nut thread at its end must be as high as from 2 to 3 and so on.

To facilitate the engagement of the tapered threads the ends $a^2$ and $b^2$ one or both should be beveled as shown in Fig. 7 the nut thread beveled in and the bolt thread beveled out.

It will be understood that by bolt and nut I refer to and include male and female screw couplings in general.

Having now described my invention, what I claim as new, and desire to secure by Letters Patent, is—

1. As a new article of manufacture, a nut and bolt, the threads of which are tapered at the end so as to be of less height than the total height of the thread, and the aggregate height of the thread ends of which is equal to or greater than the total height of the thread.

2. As a new article of manufacture, a nut and bolt, the threads of which are tapered at the end so as to be of less height than the total height of the thread and beveled as described to facilitate engagement, and the aggregate height of the thread ends of which is equal to or greater than the total height of the thread.

C. A. HIGBEE.

Witnesses:
LEWIS R. DICK,
J. H. RUSSELL.